Dec. 4, 1945. E. I. FESTER 2,390,245
CORN CUTTER AND SLED WAGON
Filed Nov. 10, 1943 2 Sheets-Sheet 1
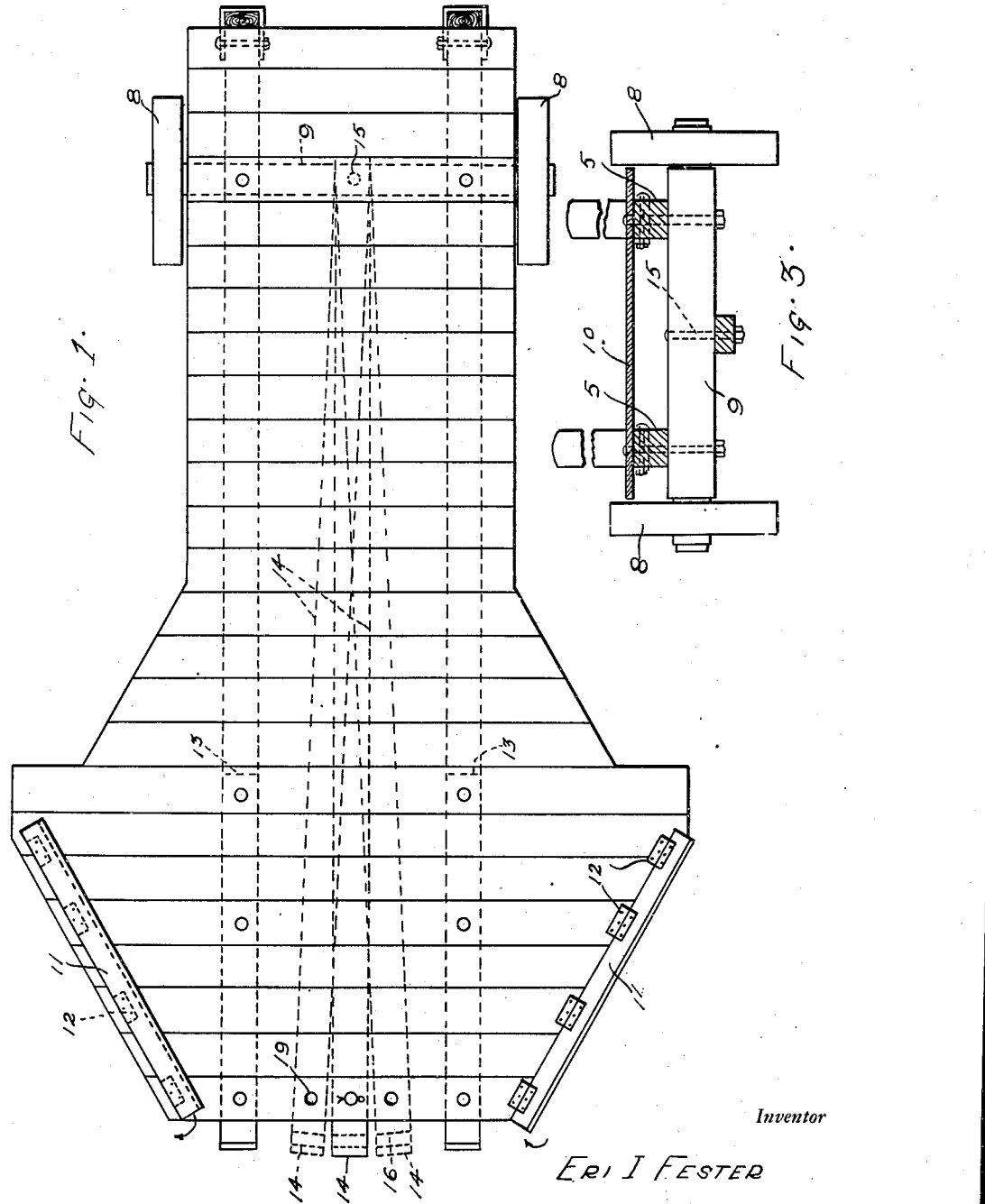
Inventor
ERI I FESTER Dec. 4, 1945.  E. I. FESTER  2,390,245
CORN CUTTER AND SLED WAGON
Filed Nov. 10, 1943  2 Sheets-Sheet 2
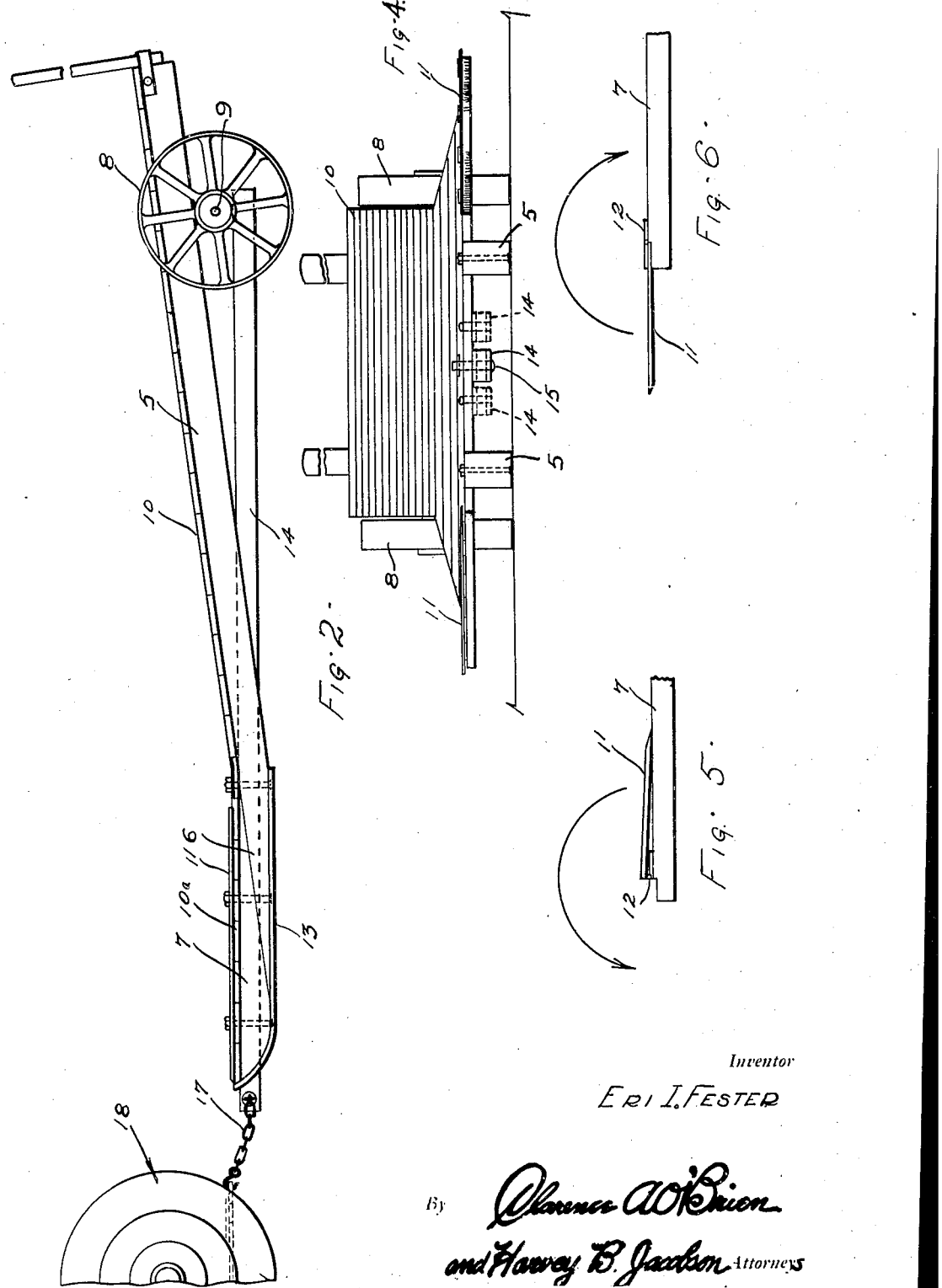
Inventor
Eri I. Fester Patented Dec. 4, 1945

2,390,245

UNITED STATES PATENT OFFICE 2,390,245

CORN CUTTER AND SLED WAGON

Eri I. Fester, Bloomsburg, Pa.

Application November 10, 1943, Serial No. 509,799

1 Claim. (Cl. 56—101)

This invention relates to new and useful improvements in corn harvesting devices and more particularly to a wheeled device, the principal object of which is to provide a structure, one end of which can readily slide along the ground while cutting standing corn.

Another important object of the invention is to provide a cutting apparatus of the character described which will save considerable time and labor in the cutting of stalk corn, such as is usually cut laboriously by hand for cattle feed.

In the drawings:

Figure 1 represents a top plan view of the wagon showing the cutters.

Figure 2 is a side elevational view.

Figure 3 is a cross section taken forwardly of the wheels and looking toward the rear end of the device.

Figure 4 is a fragmentary front elevational view.

Figure 5 is a fragmentary side elevational view showing the manner in which the blades can be swung backwardly on to the platform.

Figure 6 is a fragmentary side elevational view showing how the blades are disposed forwardly for cutting corn stalks.

Referring to the drawings wherein like numerals designate like parts, it can be seen that numeral 5 denotes the bed of the truck which is made up of a pair of elongated beams beveled at their forward ends as at 6 to accommodate beveled extensions 7 which go togther to define an oblique extension which will rest flatly on the ground and define a sled when the other ends of the said members are supported by wheels 8, these wheels 8 being carried by an axle 9. Boards 10 are secured to the bed and the extensions 7 to define a platform, boards 10a at the forward portion of the wagon being somewhat longer than the boards toward the rear end, but gradually reducing in length forwardly from a certain point so as to provide a backwardly flaring head for the platform having oblique side portions onto each of which is hinged a cutting blade 11 by hinges 12.

Metal strips or runners 13 are suitably secured to the undersides of the tapered end 6 of the bed members 5 and the extension members 7, so as to resist wear as this portion of the wagon rides the ground.

An elongated tongue 14 is swingably secured by a pin or the like 15 to the axle bar 9 and extends forwardly to project beyond the forward end of the platform, at which end the tongue is formed with an opening 16 so that a chain or the like 17 pulled by a tractor or other draft machine 18 can be disposed therethrough.

The forwardmost plank of the platform has a plurality of openings 19 through anyone of which a pin or other securing element may be disposed for disposition into the adjacent end portion of the tongue 14 to hold the same in the desired offset position, depending upon in which direction it is desired to give the wagon an offset.

One or the other of the blades 11 can be used for cutting corn stalks. As the tractor pulls the wagon, a man gathers in his arms the stalks as they are cut by the blade 11 and when he has an armful, a second man collects the stalks as they are cut in the same manner, while the first man deposits his load on the platform of the wagon and this is repeated over and over until the platform is entirely loaded with corn stalks.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A corn harvester comprising an elongated platform entirely open at the sides, spaced longitudinal supporting beams for said platform including relatively long inclined rear portions and shorter horizontal forward portions, the forward portion of said platform being horizontal and widened to form a gathering head having forwardly converging side edges, diagonally disposed blades hinged to and along the converging side edges of said head for vertical swinging movement to and from an operative position projecting laterally from the head and an inoperative position resting upon the upper face of the head, the rear portion of said platform being relatively long and inclined forwardly and adapted to have a large quantity of cut corn stored thereon transversely thereof, wheeled supporting means for the rear end of said platform, ground engaging runners on the bottom surfaces of the horizontal forward portions of said beams, and draft means to hitch the harvester to a tractor for being drawn by the latter.

ERI I. FESTER.